United States Patent
McCormick et al.

(10) Patent No.: US 6,203,768 B1
(45) Date of Patent: Mar. 20, 2001

(54) PROCESS FOR THE PRODUCTION OF ULTRAFINE PARTICLES

(75) Inventors: Paul Gerard McCormick, Nedlands (AU); Jun Ding, Singapore (SG); Wie-Fang Miao, Pittsburgh, PA (US); Robert Street, Kalamunda (AU)

(73) Assignee: Advanced Nano Technologies Pty Ltd (AU)

( * ) Notice: Subject to any disclaimer, the term of this patent is extended or adjusted under 35 U.S.C. 154(b) by 0 days.

(21) Appl. No.: 09/029,147

(22) PCT Filed: Aug. 28, 1996

(86) PCT No.: PCT/AU96/00539

§ 371 Date: Oct. 5, 1998

§ 102(e) Date: Oct. 5, 1998

(87) PCT Pub. No.: WO97/07917

PCT Pub. Date: Mar. 6, 1997

(30) Foreign Application Priority Data

Aug. 28, 1995 (AU) .................................................. PN 5047
Jan. 22, 1996 (AU) .................................................. PN 7725

(51) Int. Cl.$^7$ ........................................................ B22F 9/04

(52) U.S. Cl. ............................... 423/1; 423/263; 423/592; 423/607; 423/608; 423/610; 423/625; 423/632; 423/633; 75/352; 75/354

(58) Field of Search ................................. 423/263, 625, 423/632, 633, 607, 608, 610, 592, 1; 75/352, 354

(56) References Cited

U.S. PATENT DOCUMENTS 5,328,501 * 7/1994 McCormick et al. .
5,417,956   5/1995 Moser .................................. 423/592

FOREIGN PATENT DOCUMENTS

WO 90/07012   6/1990 (WO) .

(List continued on next page.)

OTHER PUBLICATIONS

Schaffer G. B. et al.—"Reduction of metal oxides by mechanical alloying"—Applied Physics Letters, vol. 55, No. 1, Jul. 3, 1989, pp. 45–46.

(List continued on next page.)

*Primary Examiner*—Steven P. Griffin
*Assistant Examiner*—Christina Ildebrando
(74) *Attorney, Agent, or Firm*—Michael Best & Friedrich LLP

(57) ABSTRACT

A new, cost effective process for the production of ultrafine particles which is based on mechanically activated chemical reaction of a metal compound with a suitable reagent. The process involves subjecting a mixture of a metal compound and a suitable reagent to mechanical activation to increase the chemical reactivity of the reactants and/or reaction kinetics such that a chemical reaction can occur which produces a solid nano-phase substance. Concomitantly, a by-product phase is also formed. This by-product phase is removed so that the solid nano-phase substance is left behind in the form of ultrafine particles. During mechanical activation a composite structure is formed which consists of an intimate mixture of nano-sized grains of the nano-phase substance and the reaction by-product phase. The step of removing the by-product phase, following mechanical activation, may involve subjecting the composite structure to a suitable solvent which dissolves the by-product phase, while not reacting with the solid nano-phase substance. The process according to the invention may be used to form ultrafine metal powders as well as ultrafine ceramic powders. Advantages of the process include a significant degree of control over the size and size distribution of the ultrafine particles, and over the nature of interfaces created between the solid nano-phase substance and the reaction by-product phase.

15 Claims, 5 Drawing Sheets

FOREIGN PATENT DOCUMENTS

| | | |
|---|---|---|
| WO 91/19584 | 12/1991 | (WO) . |
| WO 92/14568 | 9/1992 | (WO) . |
| WO 95/08004 | 3/1995 | (WO) . |
| WO 96/10539 | 4/1996 | (WO) . |
| WO 96/10653 | 4/1996 | (WO) . |
| WO 96/14268 | 5/1996 | (WO) . |
| WO 96/15279 | 5/1996 | (WO) . |

OTHER PUBLICATIONS

Takacs L.—"Metal—Metal Oxide Systems For Nanocomposite Formation By Reaction Milling"—Nanostructured Materials, vol. 2, No. 3, Jan. 1, 1993, pp. 241–249.

Matteazzi P. et al—"Synthesis of Nanocrystalline Alumina—Metal Composites by Room—Temperature Ball–Milling of Metal Oxides and Aluminum"—Journal of the American Ceramic Society, vol. 75, No. 10, Oct. 1, 1992, pp. 2749–2755.

Pardavi–Horvath M. et al—"Magnetic Properties of Copper–Magnetite Nanocomposites Prepared by Ball Milling"—Journal of Applied Physics—vol. 73, No. 10 Pt IIB, May 15, 1993, pp. 6958–6960.

* cited by examiner

PROCESS FOR THE PRODUCTION OF ULTRAFINE PARTICLES

FIELD OF THE INVENTION

The present invention relates to a process for the production of ultrafine particles and relates particularly, though not exclusively, to the production of ultrafine metallic and non-metallic powders consisting of individual particles with sizes in the range of 1 nm to 200 nm.

BACKGROUND TO THE INVENTION

Ultrafine powders have significant potential for a wide range of applications including catalysts, magnetic recording media, optoelectronic materials, magnetic fluids and composite materials. Ultrafine metallic powders have been prepared by physical methods, such as vapour deposition and sputtering, which have high quality, i.e. clean surfaces and uniform particle size distribution. However, industrial applications for such powders are limited by low yield rates and high cost. Alternative chemical production methods, such as thermal decomposition and precipitation are currently being studied for the preparation of a wide range of powders. Chemical methods can provide large quantities of ceramic powders for industrial applications. However, except for precious metals, chemical methods are generally not applied to the production of metallic powders.

Mechanical activation has been used for the production of fine powders with particle sizes typically in the range of 0.2 to 2 microns. One method for the production of powders by mechanical activation is the process of mechanical alloying described in U.S. Pat. No. 3,591,362, by which alloys are formed from pure starting materials by milling a mixture of the powders in a high energy ball mill. During milling the constituent particles undergo repeated collisions with the grinding balls causing deformation, welding and fracture of the particles which result in microstructural refinement and composition changes leading to the formation of nanocrystalline or amorphous alloys.

Another example of the use of mechanical activation to form fine powders, as described in U.S. Pat. No. 5,328,501, is concerned with a mechanochemical reduction process. This process involves the mechanically activated chemical reduction of reducible metal compounds with a reductant during milling in a high energy ball mill, to refine and manufacture metals, alloys and composite powders. During milling the energy imparted to the reactants through ball/reactant collision events causes repeated welding and fracture of the reactant particles. Consequently oxidation/reduction reactions occur at welded interfaces and reaction kinetics are enhanced without the need for high temperatures or melting to increase intrinsic reaction rates.

With both the above described prior art mechanically activated processes micron sized particles are formed which contain a nanometre scale mixture of phases, crystallites or amorphous regions. These processes have not previously been known to result in powders containing a significant fraction of particles with sizes less than 50 nm or interconnected networks of ultrafine particles exhibiting high values of specific surface area.

SUMMARY OF THE INVENTION

The present invention is concerned with a new process for the manufacture of ultrafine particles which is based on mechanically activated chemical reaction of a metal compound with a suitable reagent.

The process of the invention is based on the discovery that mechanical activation can be used to provide an improved, cost effective process for the production of ultrafine particles.

According to one aspect of the present invention there is provided a process for the production of ultrafine particles, the process comprising:

subjecting a mixture of a metal compound and a suitable reagent to mechanical activation to increase the chemical reactivity of the reactants and/or reaction kinetics such that a chemical reaction can occur which produces a solid nanophase substance and concomitantly forms a by-product phase, wherein said solid nanophase substance includes nano particles in the size range of 5 nm to 50 nm embedded in the by-product phase; and, removing the by-product phase such that the solid nanophase substance is left behind in the form of ultrafine particles.

The term "ultrafine particles" as used above and throughout the remainder of the specification refers to individual particles in powder form as well as to particles interconnected or embedded in a porous matrix, and typically includes nano particles in the size range of 1 nm to 200 nm, or more typically in the range 5 nm to 50 nm.

During mechanical activation a composite structure is typically formed which consists of an intimate mixture of nano-sized grains of the nanophase substance and the reaction by-product phase. The step of removing the by-product phase, following mechanical activation, may involve subjecting the composite structure to a suitable solvent which dissolves the by-product phase, while not reacting with the solid nanophase substance. Removal of the by-product leaves behind ultrafine particles of the solid nanophase substance. Alternatively, the composite structure may be subjected to heating to remove the by-product phase by evaporation. If necessary, the surfaces of the ultrafine particles may be further processed (e.g. by gaseous reduction) to remove oxide or passivating films formed during removal of the by-product phase.

In one form of the process of the invention the metal compound is an unreduced metal compound and the reagent is a suitable reductant so that when the mixture is subjected to mechanical activation a chemical reaction occurs which reduces the metal compound to a metal phase, so that subsequent removal of the by-product phase leaves behind the metal phase in the form of ultrafine particles.

Preferably the unreduced metal compound is selected from the group containing metals of low electro-negativity, including but not limited to iron, nickel, cobalt, copper, gold and platinum. Typically the unreduced metal compound is a metal oxide, a metal chloride or a metal sulphide.

Preferably the reductant is a reducing agent which forms a soluble by-product phase. Examples of suitable reductants include sodium, calcium, magnesium and aluminium.

In one embodiment of the process the mixture formed during mechanical activation consists of nanocrystallites of the metal phase embedded within the reaction by-product phase, such that the metal phase does not percolate through the particles. Removal of the by-product phase leaves a powder consisting of nanoparticles of the metal phase.

In a second embodiment of the process, the nanocrystallites of the metal phase formed by mechanical activation are percolated or interconnected through the by-product phase. Removal of the reaction by-product phase then results in micron sized particles of the metal phase interconnected in a sponge-like structure.

In another form of the process of the invention mechanical activation results in an increase in the chemical reactivity of the reactants and/or reaction kinetics such that a displacement reaction can occur which produces a non-metallic phase such as a ceramic compound, so that subsequent removal of the by-product phase leaves behind the non-metallic phase in the form of ultrafine particles.

With some reactants the displacement reaction may not occur until the mixture is subject to thermal treatment, such as by annealing, either simultaneous with or subsequent to mechanical activation.

The process may be applied to the formation of single phase alloy particles, including solid solutions and intermetallics, metal oxide or sulphide particles.

The process may be applied to the formation of nano-sized powders consisting of a mixture of two types of particles each of a different phase.

The process may be applied to the manufacture of nano particles of oxides, carbides or other compounds by subsequent reaction of the metal particles with gaseous or liquid reactants to form the required phase.

The process may also utilise heat treatment of the powder following mechanical activation and prior to removal of the reaction by-product to form a desired phase or optimise morphology for particular applications.

The process may be applied to the formation of nano particles which are embedded in a porous matrix. The porous matrix may be a reaction by-product phase formed mechanochemically and not removed or may be a third phase which remains after removal of a soluble by-product phase.

In a preferred form of the invention, mechanical activation is performed inside a mechanical mill, for example, a ball mill. Mechanical activation occurs in a ball mill when grinding media, typically steel or ceramic balls, are kept in a state of continuous relative motion with a feed material by the application of mechanical energy, such that the energy imparted to the feed material during ball-feed-ball and ball-feed-liner collisions is sufficient to cause mechanical activation.

Throughout the remainder of the specification reference will be made to mechanical activation being carried out inside a mechanical mill. Examples of this type of mill are attritor mills, mutating mills, tower mills, planetary mills, vibratory mills and gravity-dependent-type ball mills.

It will be appreciated that the mechanical activation may also be achieved by any suitable means other than ball milling. For example, mechanical activation may also be achieved using jet mills, rod mills, roller mills or crusher mills.

The roles of mechanical activation in relation to the synthesis of ultrafine particles are:

(i) to develop a nanoscale mixture of the two reactants;
(ii) to cause a chemical reaction between the reactants during mechanical activation which enables the product phases to form a nanoscale mixture containing separated nano-sized particles of the product phase; and
(iii) if the chemical reaction does not occur during mechanical activation, to increase the chemical reactivity and/or reaction kinetics of any subsequent reactions which occur on heating such that the reaction temperature is lower than the temperature normally needed for grain growth or particle coarsening.

Important factors determining the morphology of the product phase are the volume fraction of the by-product phase formed during milling, and milling parameters including the collision energy and ball size. The volume fraction of the by-product phase is a function of the reaction stoichiometry and the densities of the product phases. In the case of reduction/oxidation reactions, the highest volume fraction of the by-product phase is associated with metal compounds of the highest valency and reductants having the lowest valence. There is a minimum volume fraction of the by-product phase necessary for the desired phase to form in discrete particles during the reaction. If the volume fraction of the by-product phase is insufficient for separated particles of the desired phase to form during milling, powders of the by-product phase or other inert phases may be added prior to milling and milled with the reacting phases. Alternatively, if an interconnected product phase is required, the volume fraction of the by-product phase should be less than a critical value. If the desired phase is a metal the volume fraction of the by-product phase may be minimised by choosing reducible compounds of low valency and reductants of high valency.

The particle size formed during milling can also be a function of the type of milling process employed, the ball size and milling time. Of particular importance is the collision energy associated with ball/powder collisions, which is determined by the ball to powder mass ratio (charge ratio) and the ball size and other parameters associated with the particular milling process employed. As described in U.S. Pat. No. 5,328,501, if the collision energy during milling is too high the exothermic nature of a chemical reduction reaction can cause it to occur in an unstable, combustive manner, resulting in melting and even vaporisation of the product phases and a significant increase in particle size and changes in product morphology. The collision energy required to cause combustion is a function of the enthalpy change associated with the reaction as well as other factors.

The processing parameters depend on the nature of the metal compounds being processed, the size and distribution of the ultrafine particles being produced and the type of mechanical activation employed.

In the process of ball milling the reactants, including the metal compound and a suitable reagent, collide with each other and the grinding media. Either the reagent or the metal compound will be a solid and the reactivity of the reactants increases due to the increase in reaction area resulting from the decrease in the grain and particle sizes of the solid phase associated with collision events. A welding, mixing of atoms and/or exchange of atoms occurs at the interfaces of colliding particles to promote reactivity. With solid reagents a displacement reaction may occur at or near the interfaces during the compaction and welding of the metal compound and the reagent. With liquid or gaseous reagents, the reaction may occur as a result of the contact of fresh surfaces of the metal compound created by the ball/powder collisions in the ball mill with the reagent atmosphere.

BRIEF DESCRIPTION OF THE DRAWINGS

The invention is further described in and illustrated by the following examples, which are not to be construed as limiting the invention in any way, to be read in conjunction with the accompanying drawings, in which.

DETAILED DESCRIPTION OF PREFERRED EMBODIMENTS

EXAMPLE 1

Synthesis of Ultrafine Iron Particles

The materials used were anhydrous $FeCl_3$ powder (−100 mesh) and Na pieces (≦5 mm). The starting mixture of $FeCl_3$ and Na in a molar ratio of 1:3, corresponding to the reaction:

$$FeCl_3 + 3\ Na \rightarrow Fe + 3\ NaCl \qquad (1)$$

was loaded and sealed in a hardened steel vial with twenty 4.8 mm steel balls under an argon atmosphere. The mechanical activation was carried out in a SPEX 8000 mixer/mill. The as-milled powder was washed several times with deionised, deoxygenated water and rinsed with methanol in an ultrasound cleaner. The washed powder was dried by evaporation and all subsequent powder handling was carried out in an argon filled glove box.

Figure 1:
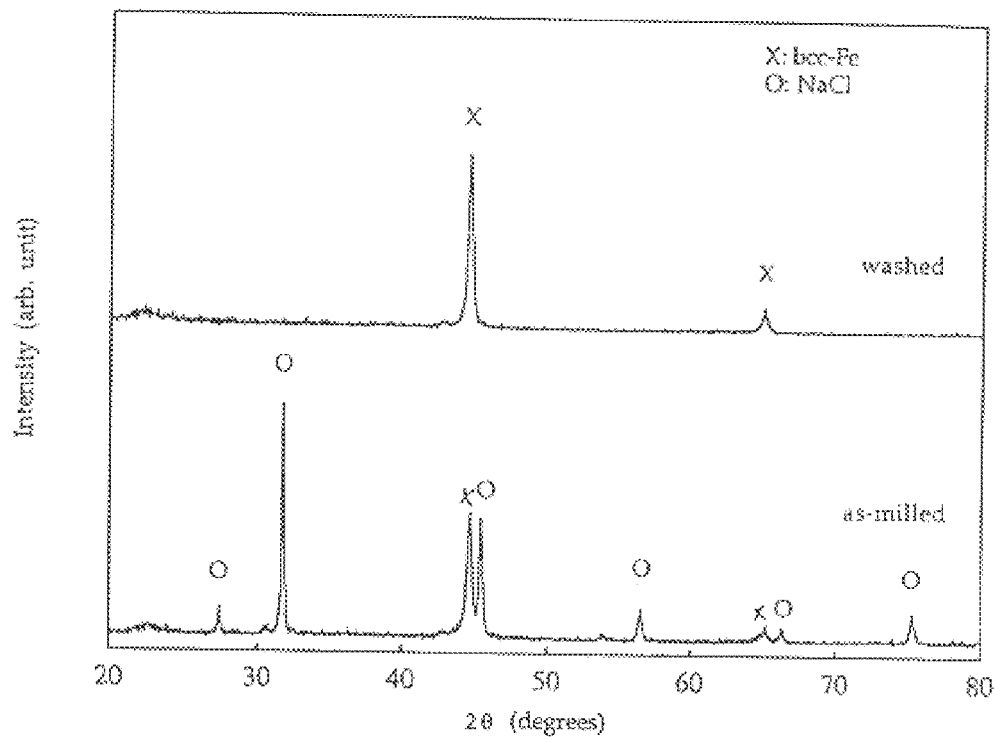
FIG. 1 is a graphical representation of x-ray diffraction patterns for an as-milled and subsequently washed mixture of $FeCl_3$ and Na.

FIG. 1 shows the x-ray diffraction patterns of as-milled and subsequently washed powders milled for 8 hours. The as-milled powder consisted of a mixture of NaCl and Fe. The formation of Fe is due to the mechanically activated reduction of $FeCl_3$ by Na via the reaction (1) above during milling. No NaCl was visible in the x-ray diffraction patterns of the powder after the washing process (FIG. 1).

The peaks for the α-Fe phase were broad, corresponding to a crystallite size of approximately 10 nm. Residual unreacted $FeCl_3$ and Na were also removed during washing.

Figure 2:
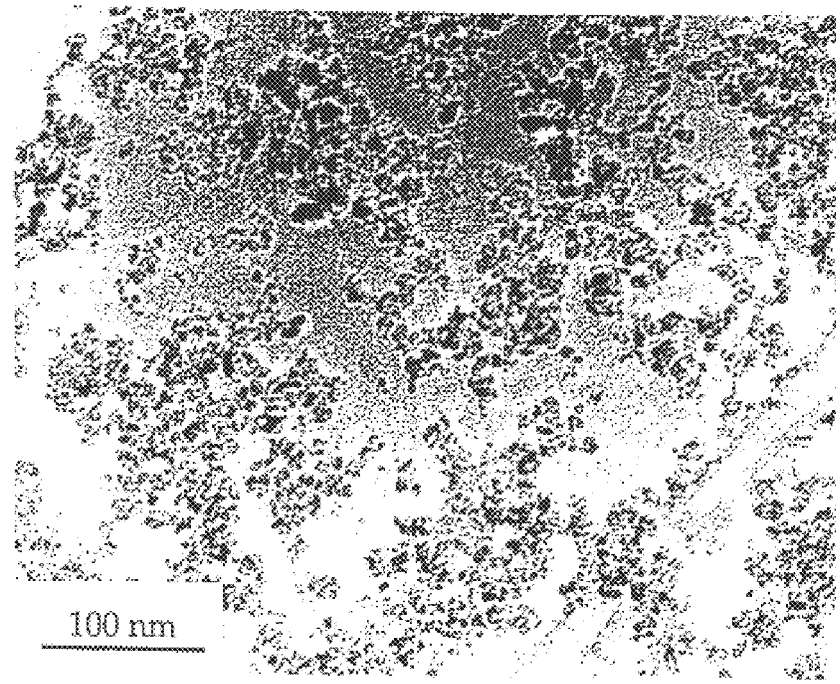
FIG. 2 is a TEM micrograph of Fe particles after washing.

A TEM micrograph of the Fe particles after washing is shown in FIG. 2. Most of the Fe particles had a size of ~10 nm and each particle consists of a single crystal or grain of Fe. No traces of chlorine or sodium were found using energy dispersive spectroscopy. The effective surface area of the iron particle measured by the BET method was 32 $m^2/g$.

Figure 3:
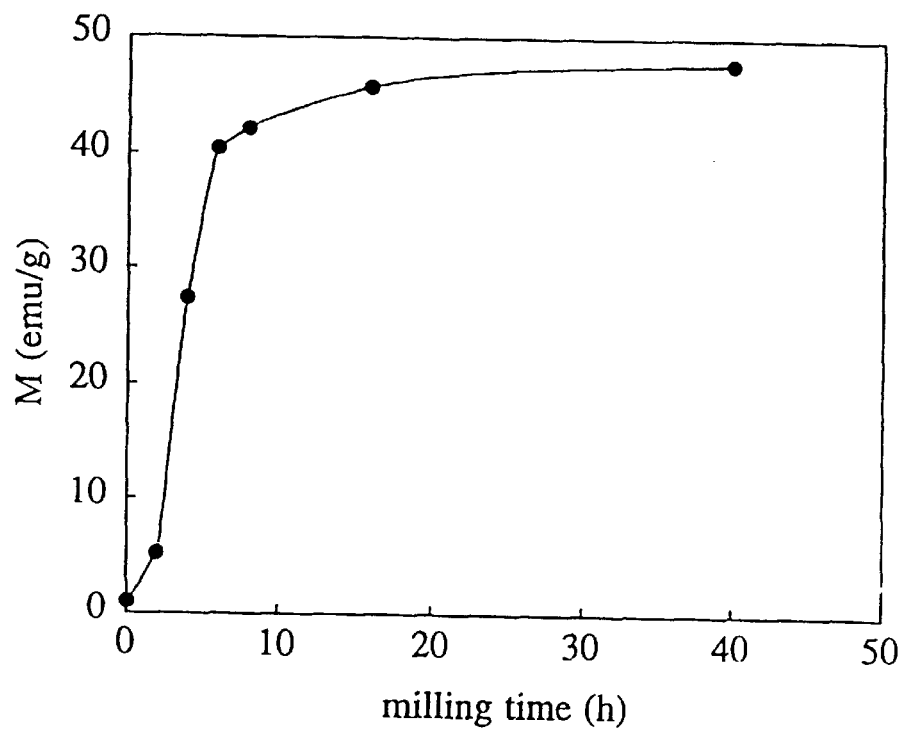
FIG. 3 is a graphical representation of magnetisation measurements taken after milling of the $FeCl_3$ and Na for various times.

The progress of the reaction was followed with measurements of magnetisation to determine the amount of iron present. FIG. 3 shows measurements of magnetisation as a function of milling time for samples milled with 4.8 mm steel balls. To complete the formation of the Fe particles required a milling time of approximately 6–8 hours using the SPEX 8000 mixer/mill. The particle size measured using x-ray diffraction and electron microscopy was about 10 nm for milling times up to 8 hours. With increasing milling times, the particle size increased slowly to about 20 nm after milling for 40 hours. Using a smaller ball size of 3.2 mm diameter, resulted in a decrease in the particle size to an average of 7 nm after 24 hours of milling.

When larger balls were used, (9.5 and 12 mm diameter) a combustion reaction was observed. The resulting Fe articles could be classified into two groups. One group had a particle size around 10 nm, similar to that obtained using smaller balls, while the other had a wide range of larger particle sizes of 60–200 nm. The larger particles were formed by vaporisation and condensation of Fe as a consequence of the combustion reaction.

Fe particles were also produced by mechanochemical reduction of $FeCl_3$ using Mg and Al powders as the reducing agents, by the following chemical reactions: the following chemical reactions:

$$FeCl_3 + 1.5\ Mg \rightarrow Fe + 1.5\ MgCl_2 \qquad (2)$$

$$FeCl_3 + Al \rightarrow Fe + AlCl_3 \qquad (3)$$

The milling conditions used were the same as for reaction (1) described above.

Reactions (2) and (3) differ from reaction (1) by the molar ratio of the iron to the chloride reaction by-product. Table 1 shows the particle size produced after milling and molar ratio of Fe to chloride for each reaction. It will be seen that there is a correlation between the respective particle sizes and the molar ratios, with the particle size increasing with increasing molar ratio. It is noted that for a given reaction the molar ratio may be decreased by adding additional reaction by-product to the reactants prior to milling.

TABLE 1

| Reaction | Particle Size | Molar Ratio |
| --- | --- | --- |
| $FeCl_3 + 3Na \rightarrow Fe + 3NaCl$ | 10 nm | 0.33 |
| $FeCl_3 + 1.5Mg \rightarrow Fe + 1.5MgCl_2$ | 40–100 nm | 0.66 |
| $FeCl_3 + Al \rightarrow Fe + AlCl_3$ | 3–10 μm | 1.00 |

Ultrafine Fe particles have also been successfully prepared using an attritor, where the particle size was similar to that prepared using SPEX 8000 mixer/mill.

EXAMPLE 2

Synthesis of Ultrafine Copper Particles

The materials used were anhydrous $CuCl_2$ powder (−100 mesh) and Na pieces (55 mm), Mg powder (−100 mesh) or Al powder (−100 mesh). Mixtures of the reactants corresponding to the reactions:

$$CuCl_2 + 2\ Na \rightarrow Cu + 2\ NaCl \qquad (4)$$

$$CuCl_2 + Mg \rightarrow Cu + MgCl_2 \qquad (5)$$

$$3\ CuCl_2 + 2\ Fe \rightarrow 3\ Cu + 2\ FeCl_3 \qquad (6)$$

were loaded and sealed in a hardened steel vial with twenty 4.8 mm steel balls under an argon atmosphere. The mechanical as-milled powder was washed several times with deionised, deoxygenated water and rinsed with methanol in an ultrasound cleaner. The washed powder was dried by evaporation and all subsequent powder handling was carried out in an argon filled glove box.

Figure 4:
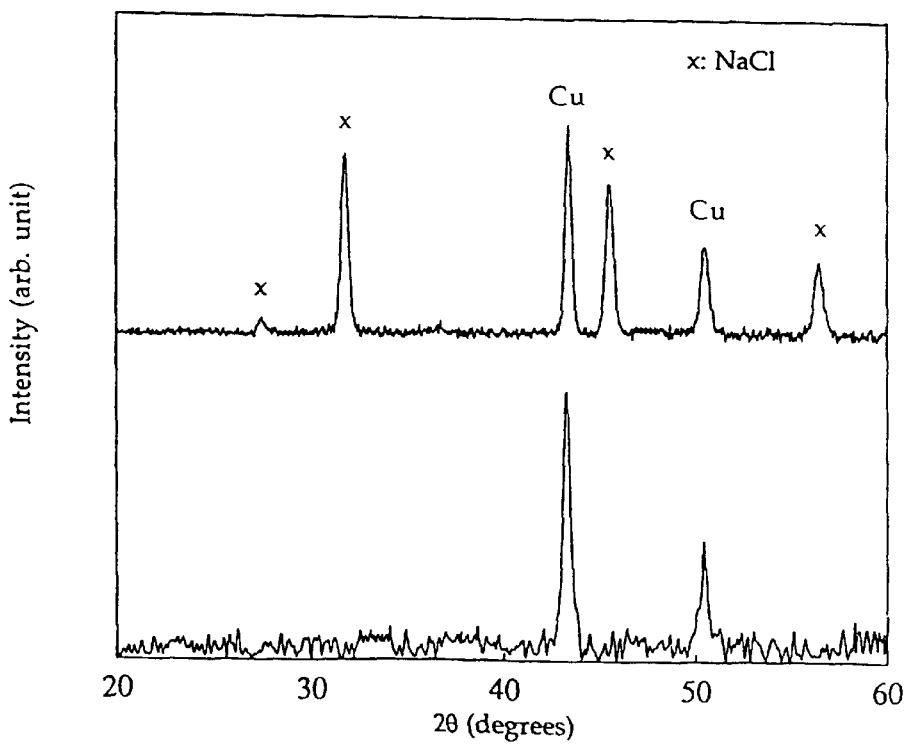
FIG. 4 is a graphical representation of x-ray diffraction patterns for an as-milled and subsequently washed mixture of $CuCl_2$ and Na.

FIG. 4 shows the x-ray diffraction patterns for powders from reaction (4) after milling for 8 hours and after washing. The as-milled powder consisted of a mixture of NaCl and Cu. The formation of Cu is due to the reduction of $CuCl_2$ via reaction (4) above during milling. No NaCl was visible in the x-ray diffraction patterns of the powder after the washing process (FIG. 4). The peaks for the Cu phase were broad, corresponding to an average crystallite size of approximately 20 nm.

Figure 5:
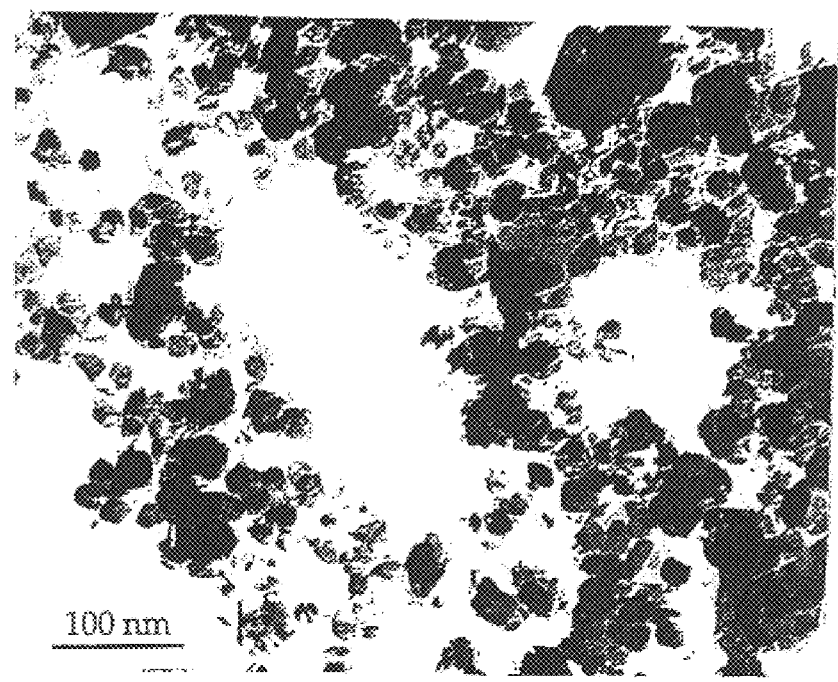
FIG. 5 is a TEM micrograph of Cu particles after washing.

A TEM micrograph of the Cu particles after washing is shown in FIG. 5. The Cu particles have sizes of ~20–100 nm and each particle consists of a single crystal or grain of Cu.

Reactions (5) and (6) differ from reaction (4) by the molar ratio of the copper to the chloride reaction by-product. Table 2 shows the particle sizes produced after milling and volume ratio of copper to chloride for each reaction. It is seen that results show an excellent correlation between the particle size and the molar ratios.

TABLE 2

| Reaction | Particle Size | Molar Ratio |
|---|---|---|
| $CuCl_2 + 2Na \rightarrow Cu + 2NaCl$ | 10–100 nm | 0.5 |
| $CuCl_2 + Mg \rightarrow Cu + MgCl_2$ | 30–300 nm | 1.0 |
| $3CuCl_3 + 2Fe \rightarrow 3Cu + 2FeCl_3$ | 0.1–20 μm | 1.5 |

Figure 6:
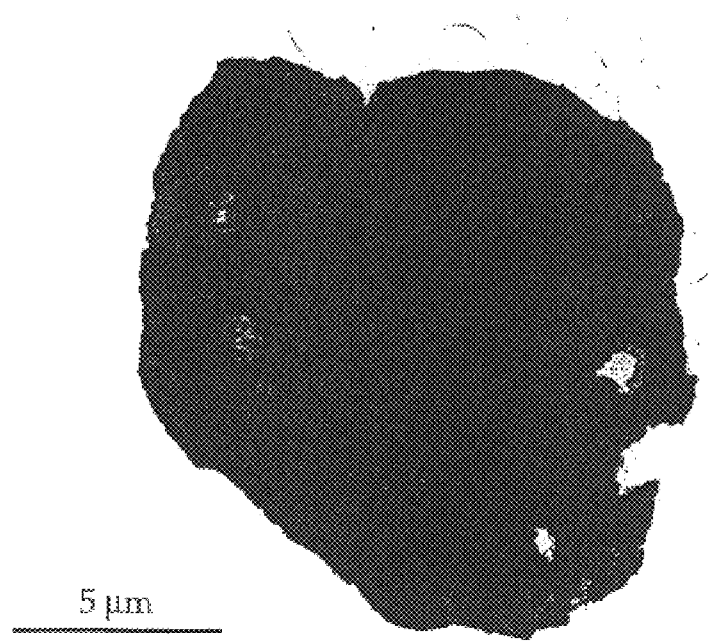
FIG. 6 is a TEM micrograph of a porous structure of Cu nano particles.

Cu particles synthesised from reaction (6) exhibited a wide size distribution of 0.1–20 μm. A typical particle is shown in FIG. 6. The particles had a porous structure, where each particle consisted of composite of many small interconnected Cu particles, indicating that the low volume fraction of $FeCl_3$ was insufficient to separate the individual Cu particles.

EXAMPLE 3

Synthesis of Ultrafine Nickel Particles

Figure 7:
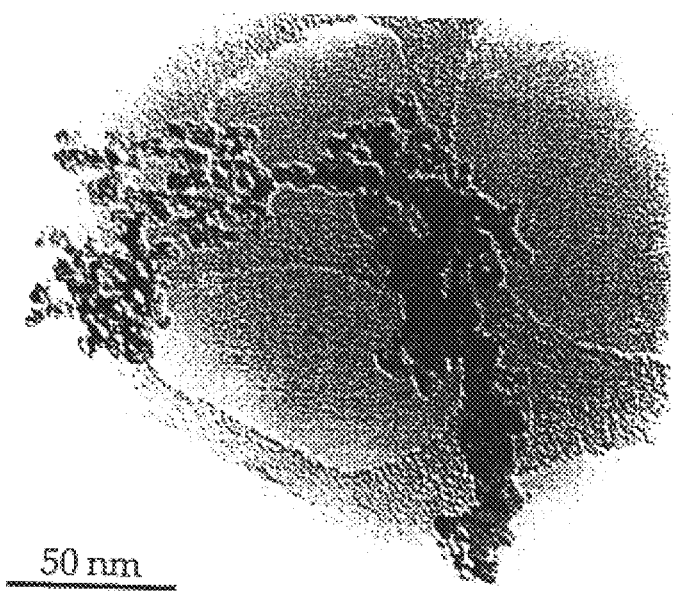
FIG. 7 is a TEM micrograph of Ni nano particles.

Ni particles were synthesised through the reaction of $NiCl_2 + 2 Na \rightarrow Ni + 2 NaCl$ using the milling and other conditions described in Example 1. The resulting particle sizes as determined from x-ray diffraction and transmission electron microscopy measurement were in the range of 10 to 20 nm. FIG. 7 shows typical nano particles of nickel produced by the reaction.

EXAMPLE 4

Synthesis of Ultrafine Cobalt Particles

Co particles were synthesised through the reaction of $CoCl_2 + 2 Na \rightarrow Co + 2 NaCl$ using the milling and other conditions described in Example 1. The resulting particle sizes as determined from x-ray diffraction and transmission electron microscopy measurement were in the range of 20 to 50 nm. The particle sizes were almost identical to that for the nickel as expected since these two reactions have the same molar by-product ratio.

EXAMPLE 5

Synthesis of Fe—Ni Alloy Particles

Particles of an iron-nickel were synthesised by the reaction of $FeCl_3 + NiCl_2 + 5 Na \rightarrow FeNi + 5 NaCl$ using the milling and other conditions described in Example 1. X-ray diffraction showed that the powder consisted of an fcc phase, indicating the formation of the alloy of $Fe_{50}Ni_{50}$. This composition was confirmed by a $Fe^{57}$-Mössbauer study. The particle size was 5–10 nm.

All of the above examples involved mechanical activation of an unreduced metal compound and a suitable reductant such that an oxidation/reduction reaction occurred to form ultrafine metal powders. However it has been found that the process of the invention can also be applied to the production of other ultrafine powders using reactions which do not involve oxidation or reduction of the reactants.

For example the following reactions for making ultrafine ceramic powders ($Al_2O_3$—alumina, $ZrO_2$—zirconia) may also be employed:

$$2 AlCl_3 + 3 CaO \rightarrow Al_2O_3 + 3 CaCl_2$$

$$2 Al(OH)_3 + 3 CaO \rightarrow Al_2O_3 + 3 Ca(OH)_2$$

$$ZrCl_4 + 2 CaO \rightarrow ZrO_2 + 2 CaCl_2$$

$$2 AlCl_3 + 3 Ca(OH)_2 \rightarrow Al_2O_3 + 3 CaCl_2 + 3 H_2O$$

EXAMPLE 6

Synthesis of Ultrafine Alumina Particles

Figure 8:
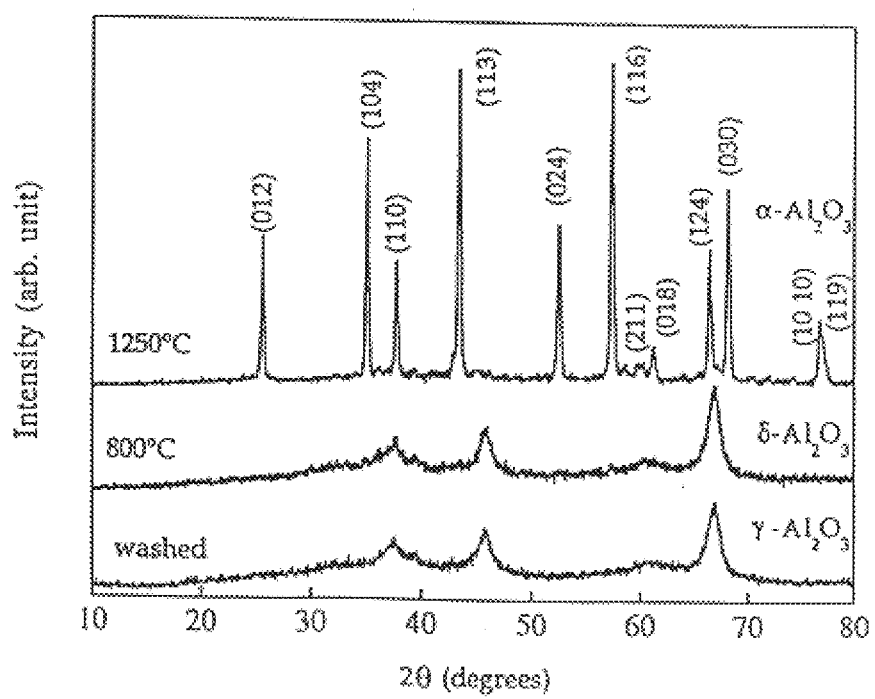
FIG. 8 is a graphical representation of x-ray diffraction patterns for an as-milled and subsequently annealed mixture of $AlCl_3$ and CaO.

The materials used were anhydrous AlCl3 (≦100 mesh) and CaO (≦100 mesh). The starting mixture of $AlCl_3$ and CaO in a molar ratio of 2:3, corresponding to the reaction:

$$2 AlCl_3 + 3 CaO \rightarrow Al_2O_3 + 3 CaCl_2 \tag{7}$$

was loaded and sealed in a hardened steel vial with 9.5 mm steel balls under an air atmosphere. The ball to powder mass ratio was 8.1. The mechanical activation was carried out in a SPEX 8000 mixer/mill for 24 hours. FIG. 8 shows an x-ray diffraction pattern of the as-milled powder. Only the diffraction peaks of CaO phase were present on the XRD patterns of as-milled samples. TEM examination showed micron sized particles consisting of an agglomeration of nanocrystallites of CaO embedded in an amorphous matrix. No evidence of the formation of $Al_2O_3$ was found after milling. XRD diffraction patterns for samples heated to 150°, 300° and 400° C. are also shown in FIG. 8. The patterns show that heating at 150° C. caused formation of the $AlCaCl_5$ phase, due to the reaction 5 $AlCl_3 + 3$ CaO $\rightarrow 3$ $AlCaCl_5 + Al_2O_3$. X-ray diffraction measurements on samples annealed at 300° C. showed peaks associated with $CaCl_2$ and a reduction in intensity of the $AlCaCl_5$ and CaO peaks, thus indicating that the reaction $AlCaCl_5 + CaO \rightarrow Al_2O_3 + CaCl_2$ occurred. Completion of the formation of $CaCl_2$ required an annealing temperature of 350° C. or above. All peaks in the x-ray diffraction pattern of the sample annealed at 400° C. could be indexed to the $CaCl_2$ phase. No crystalline alumina phases were seen in the XRD patterns of samples annealed at 350° and 400° C., however, this was due to the small fraction of alumina present and the small particle size.

Figure 9:
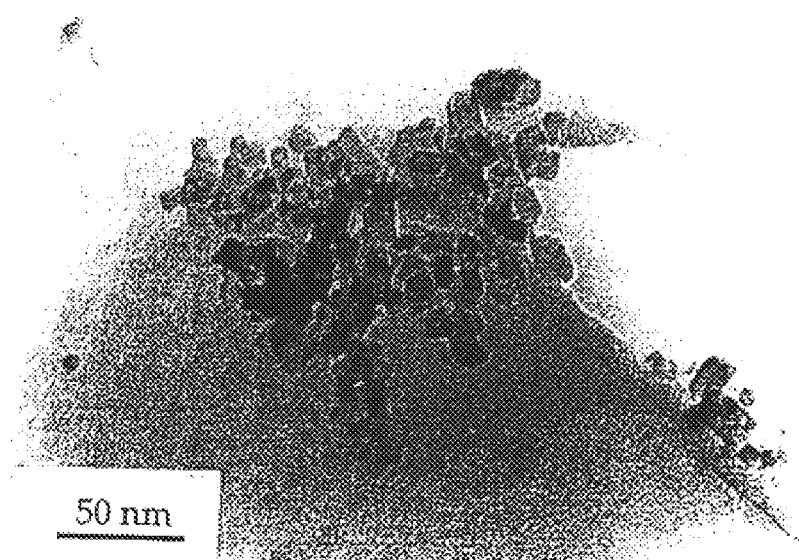
FIG. 9 is a TEM micrograph of $Al_2O_3$ particles after washing.

FIG. 9 shows a transmission electron micrograph of a sample milled for 24 hours, heat treated at 350° C. and washed in water to remove the $CaCl_2$ reaction by-product. The sample consisted of individual particles of alumina with sizes between 10 and 20 nm. The sample formed α—$Al_2O_3$ after heat treatment at 1250° C. Similar results were obtained in samples milled with 6.4 and 12.6 mm balls.

EXAMPLE 7

Synthesis of Ultrafine Zirconia Particles

The materials used were anhydrous $ZrCl_4$ (²100 mesh) and CaO (²100 mesh). The starting mixture of $ZrCl_4$ and CaO in a molar ratio of 1:2, corresponding to the reaction:

$$ZrCl_4 + 2 CaO \rightarrow ZrO_2 + 2 CaCl_2 \tag{8}$$

was loaded and sealed in a hardened steel vial with 12 mm diameter steel balls under an air atmosphere. The ball to powder mass ratio was 10:1. The mechanical activation was carried out in a SPEX 8000 mixer/mill for 24 hours. X-ray diffraction analysis of the as-milled powder showed only the presence of CaO. No evidence of the formation of $ZrO_2$ was found after milling user x-ray diffraction measurements. Transmission electron microscopy examination showed micron sized particles consisting of an agglomeration of nanocrystallites of CaO embedded in an amorphous matrix.

Figure 10:
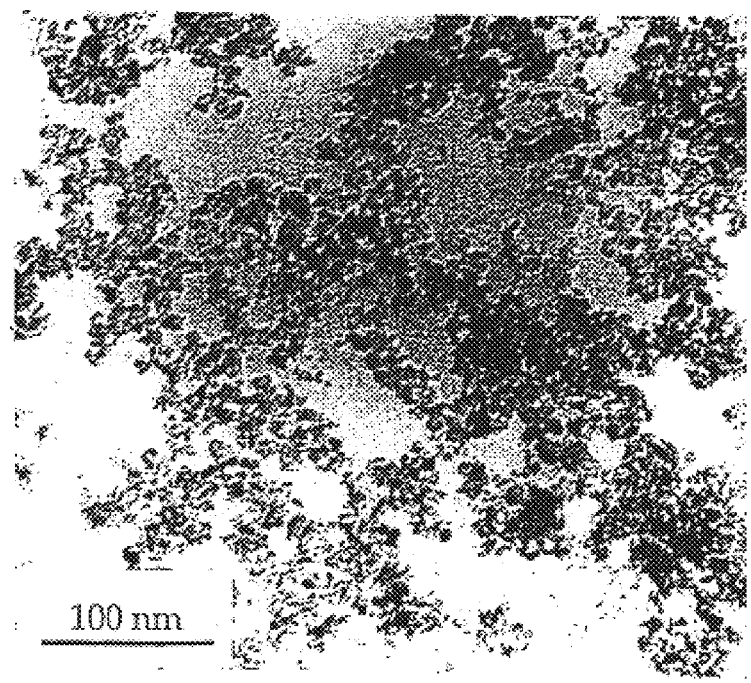
FIG. 10 is a TEM micrograph of $ZrO_2$ particles after washing.

Formation of $ZrO_2$ nanoparticles occurred during heat treatment at 400° C. FIG. 10 shows a transmission electron micrograph of a sample milled for 24 hours, heat treated at 400° C. and washed in water to remove the CaCl$_2$ reaction by-product. The sample consisted of individual particles of zirconia with sizes between 5 and 20 nm.

These examples show that the production of nano-sized alumina and zirconia particles by mechanochemical processing can be achieved from economical starting materials—AlCl$_3$, ZrCl$_4$ and CaO. The process includes a milling at a relatively low energy level, annealing at 300–400° C. and a simple washing process. Milling at low energy level is promising for large quantity production using commercial mills. Therefore, the development of this processing method may lead to a new production process of nano-sized alumina and other ceramic powders in an economical and efficient way.

Examples of other reactions in accordance with the invention which do not involve oxidation or reduction of the reactants to produce ultrafine particles are:

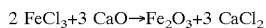

2 FeCl$_3$+3 CaO→Fe$_2$O$_3$+3 CaCl$_2$

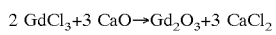

2 GdCl$_3$+3 CaO→Gd$_2$O$_3$+3 CaCl$_2$

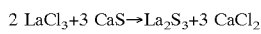

2 LaCl$_3$+3 CaS→La$_2$S$_3$+3 CaCl$_2$

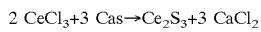

2 CeCl$_3$+3 CaS→Ce$_2$S$_3$+3 CaCl$_2$

EXAMPLE 8

Ultrafine hematite Fe$_2$O$_3$ powders have been synthesized by mechanochemical processing based on the solid-state reactions,

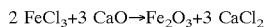

2 FeCl$_3$+3 CaO→Fe$_2$O$_3$+3 CaCl$_2$

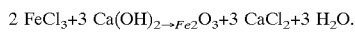

2 FeCl$_3$+3 Ca(OH)$_2$→Fe$_2$O$_3$+3 CaCl$_2$+3 H$_2$O.

Dried FeCl$_3$, CaCl$_2$, CaO and Ca(OH)$_2$ powders of >99% purity were used as the starting materials. Mechanical milling was carried out for 24 hours in a sealed, hardened steel vial using a SPEX 8000 mixer/mill. The charge ratio of ball to powder mass was 5:1 and 4.8 mm diameter hardened steel balls were used. Initial powder handling and vial loading were carried out in a high-purity argon filled glove box. After milling, the powders were heat treated in a vacuum at temperatures between 50 and 600° C. for 60 minutes. To remove the reaction by-product, the samples were washed with methanol in an ultrasound bath and dried.

Milling of 2 FeCl$_3$+3 CaO led to a nanocrystalline mixture of these two compounds. Fe$_2$O$_3$ was formed after annealing at 150° C. or above. After washing the powder mainly consisted of single crystal Fe$_2$O$_3$ platelets, with a particle size distribution in the range of 100–500 nm. An addition of 100% CaCl$_2$, ie. 2 FeCl$_3$+3 CaO+5 CaCl$_2$, into the starting material resulted in a strong reduction of the Fe$_2$O$_3$ particle size to 10–30 nm.

Nanocrystalline tetragonal akaganeite, FeOOH phase, together with calcium chloride was found after milling of 2 FeCl$_3$+3 Ca(OH)$_2$. Fe$_2$O$_3$ was formed after dehydration through heat treatment at temperatures above 200° C. Pure ultrafine Fe$_2$O$_3$ particles of 20–50 nm in size were obtained after a washing process using methanol to remove the CaCl$_2$ reaction by-product.

EXAMPLE 9

Synthesis of Ultrafine Rare Earth Oxide Particles

The reaction of 2 GdCl$_3$+3 CaO→Gd$_2$O$_3$+3 CaCl$_2$ has a negative free energy of about 70 KJ/mole. The materials used were anhydrous GdCl$_3$ (−20 mesh) and CaO (≦−100 mesh). The starting mixture of GdCl$_3$ and CaO in a molar ratio of 2:3 was loaded and sealed in a hardened steel vial with 12.6 mm diameter steel balls under an argon atmosphere. The ball to powder mass ratio was 10:1. The mechanical activation was carried out in a SPEX 8000 mixer/mill. The as-milled powder was washed in the same manner as in Example 1.

After milling for 24 hours, GdOCl was formed due to the reaction of GdCl$_3$+CaO→GdOCl+2 CaCl$_2$. The particle size of GdOCl as determined from transmission electron microscopy measurements was 10–50 nm. The formation of Gd$_2$O$_3$ ultrafine particles occurred during the heat treatment of the milled sample at 700° C. or above. The resulting particle size was approximately 100 nm.

EXAMPLE 10

Synthesis of Ultrafine Rare Earth Sulfide Particles

The materials used were anhydrous rare earth chlorides such as LaCl$_3$ and CeCl$_3$ (−20 mesh), and CaS (≦−100 mesh). The starting mixture of rare earth chloride and CaS in a molar ratio of 2:3, corresponding to the reactions:

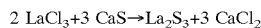

2 LaCl$_3$+3 CaS→La$_2$S$_3$+3 CaCl$_2$

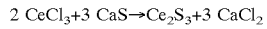

2 CeCl$_3$+3 CaS→Ce$_2$S$_3$+3 CaCl$_2$ were loaded and sealed in a hardened steel vial with 12.6 mm diameter steel balls under an argon atmosphere. The ball to powder mass ratio was 10:1. The mechanical activation was carried out in a SPEX 8000 mixer/mill for 24 hours. The as-milled powder was washed several times with methanol in an ultrasound cleaner. The resulting particle sizes as determined from X-ray diffraction and transmission electron microscopy measurements were in the range of 10 to 100 nm.

EXAMPLE 11

Synthesis of Ultrafine Zinc Sulfide Particles

The materials used were anhydrous ZnCl$_2$ (−20 mesh) and CaS (≦−100 mesh and ~10 nm). The starting mixture of ZnCl$_2$ and CaS in a molar ratio of 1:1 corresponding to the reaction ZnCl$_2$+CaS→ZnS+CaCl$_2$ was loaded and sealed in a hardened steel vial with 12.6 mm diameter steel balls under an argon atmosphere. The ball to powder mass ratio was 10:1. The mechanical activation was carried out in a SPEX 8000 mixer/mill. The as-milled powder was washed several times with methanol in an ultrasound cleaner. Using CaS of ≦−100 mesh, the complete formation of ZnS particles required a milling time of approximately 36 hours. The resulting particle size as determined from X-ray diffraction and transmission electron microscopy measurements was approximately 15 nm. On the other hand, with CaS of ~10 nm, which was synthesised by mechanical alloying, the resulting particle size was 5–10 nm.

The process for the production of ultrafine particles using mechanical activation as described above, has a number of advantages over conventional processing methods including:

(1) The process is essentially a low temperature process and therefore does not require the complex control systems associated with some chemical and physical production methods.

(2) The process enables a significant degree of control over the size and size distribution of the ultrafine particles production by controlling the parameters of mechanical activation and the reaction stoichiometry.

(3) The process also enables a significant degree of control over the nature of interfaces created between the solid nanophase substance and the reaction by-product phase.

(4) The process is relatively inexpensive and has a high yield rate, so that it can be readily modified for the synthesis of ultrafine particles on a commercial scale.

It will be apparent to persons skilled in the materials and chemical engineering arts that numerous enhancements and modifications can be made to the above described process without departing from the basic inventive concepts. All such modifications and enhancements are considered to be within the scope of the present invention, the nature of which is to be determined from the foregoing description. Furthermore, the preceding examples are provided for illustrative purposes only, and are not intended to limit the scope of the process of the invention.

The claims defining the invention are as follows:

1. A process for the production of ultrafine particles, the process comprising:

subjecting a mixture of a metal compound and a reagent to mechanical activation such that a chemical reaction occurs which produces a solid nanophase substance and concomitantly forms a by-product phase having a volume fraction, wherein the volume fraction of the by-product phase is controlled by addition of by-product phase prior to said mechanical activation such that the nanophase substance forms individual particles in the size range of 5 nm to 50 nm embedded in the by-product phase; and removing the by-product phase such that the solid nanophase substance is left behind as discrete ultrafine particles.

2. A process for the production of ultrafine particles as defined in claim 1, further comprising processing surfaces of the ultrafine particles to remove oxide or passivating films formed during removal of the by-product phase.

3. A process for the production of ultrafine particles as defined in claim 1, wherein the metal compound is an unreduced metal compound and the reagent is a reductant so that when the mixture is subjected to mechanical activation a chemical reaction occurs which reduces the metal compound to a metal phase, so that subsequent removal of the by-product phase leaves behind the metal phase as ultrafine particles.

4. A process for the production of ultrafine particles as defined in claim 3, wherein the unreduced metal compound is selected from the group consisting of metals of low electro-negativity.

5. A process for the production of ultrafine particles as defined in claim 4, wherein the unreduced metal compound is selected from the group consisting of iron, nickel, cobalt, copper, gold and platinum.

6. A process for the production of ultrafine particles as defined in claim 3, wherein the unreduced metal compound is selected from the group consisting of metal oxides, metal chlorides and metal sulphides.

7. A process for the production of ultrafine particles as defined in claim 3, wherein the reductant is a reducing agent which forms a soluble by-product phase.

8. A process for the production of ultrafine particles as defined in claim 7, wherein the reductant is selected from the group consisting of sodium, calcium, magnesium and aluminum.

9. A process for the production of ultrafine particles as defined in claim 3, wherein the unreduced metal compound is selected from the group consisting of $FeCl_3$, $CuCl_2$, $NiCl_2$ and $CoCl_2$.

10. A process for the production of ultrafine particles as defined in claim 1, wherein mechanical activation results in an increase in chemical reactivity of reactants and/or reaction kinetics such that a displacement reaction occurs which produces a non-metallic phase, so that subsequent removal of the by-product phase leaves behind the non-metallic phase formed as ultrafine particles.

11. A process for the production of ultrafine particles as defined in claim 10, further comprising subjecting the mixture to thermal treatment, either simultaneous with or subsequent to mechanical activation to enable the displacement reaction to occur.

12. The process of claim 11, wherein the mixture is subjected to thermal treatment by annealing.

13. A process for the production of ultrafine particles as defined in claim 10, wherein the metal compound is selected from the group consisting of $AlCl_3$, $Al(OH)_3$, $ZrCl_4$, $ZnCl_2$, $FeCl_3$, $GdCl_3$, $LaCl_3$ and $CeCl_3$.

14. A process for the production of ultrafine particles as defined in claim 10, wherein the reagent is selected from the group consisting of $CaO$, $Ca(OH)_2$ and $CaS$.

15. The process of claim 10, wherein the non-metallic phase is a ceramic compound.

* * * * *